United States Patent [19]

Lant

[11] 4,116,281

[45] Sep. 26, 1978

[54] FAST CLAMP CHISEL TRIP

[75] Inventor: Lawrence L. Lant, Evansville, Ind.

[73] Assignee: Chem-Farm Inc., Evansville, Ind.

[21] Appl. No.: 752,679

[22] Filed: Dec. 20, 1976

[51] Int. Cl.² .............................................. A01B 61/04
[52] U.S. Cl. .................................................. 172/267
[58] Field of Search ............... 172/267, 266, 265, 268, 172/264, 710

[56] References Cited

U.S. PATENT DOCUMENTS

| 3,223,175 | 12/1965 | Twidale | 172/264 |
| 3,275,086 | 9/1966 | Morris | 172/266 |
| 3,529,673 | 9/1970 | Morris | 172/266 |

FOREIGN PATENT DOCUMENTS 731,389  4/1966  Canada ..................................... 172/276

Primary Examiner—Richard J. Johnson
Attorney, Agent, or Firm—Olson, Trexler, Wolters, Bushnell & Fosse, Ltd.

[57] ABSTRACT

A fast clamp chisel trip apparatus is disclosed for use with a chisel plow having a frame with a tool attached thereto with means for lowering and raising the tool to positions for working and for transporting said plow, respectively. The embodiment of the apparatus disclosed includes means for holding the tool in a rigid position for plowing while the plow is in its work position, said means being adapted to remove the tool from this rigid position whenever the tool, while in the process of plowing, encounters any force of resistance greater than a predetermined force. Also included are means for setting said predetermined force into the apparatus, and means for returning the tool to its rigid position for plowing when the source of said resistance force has been by-passed.

5 Claims, 3 Drawing Figures

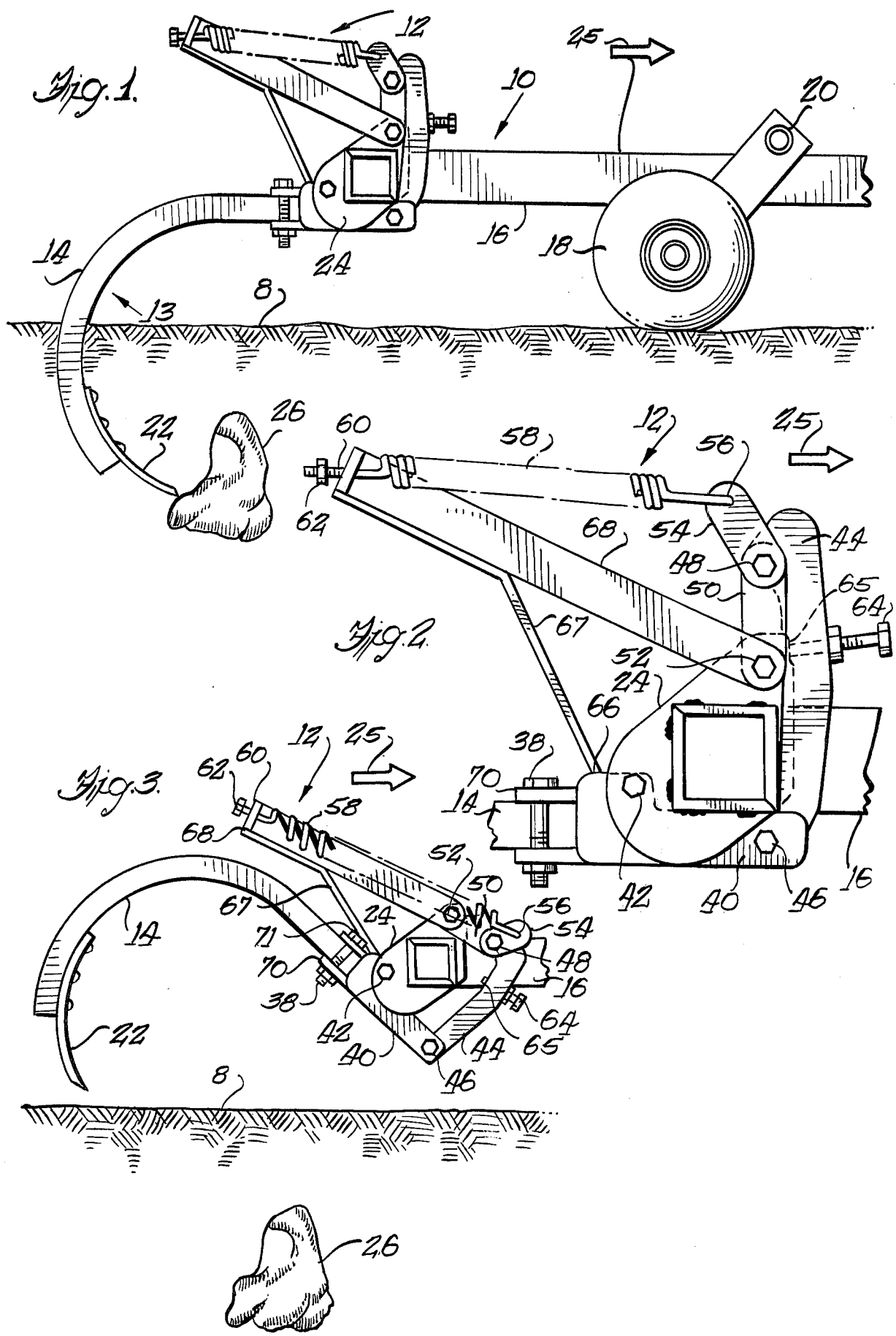

FAST CLAMP CHISEL TRIP

BACKGROUND OF THE INVENTION

The present invention relates to a novel apparatus for use with a chisel plow, having a shank which may have a tip member or shovel connected thereto for plowing. More particularly, the invention includes a novel apparatus for preventing damage to the tip member or shovel and the shank when, during plowing, a relatively immovable object, such as a large rock, is encountered.

A chisel plow is a well-known farm implement for use in plowing fields. A chisel plow typically comprises a rigid frame mounted on wheels via wheel supporting struts and a rockshaft transversely journalled upon the frame, and a plurality of plowing tools attached thereto to furrow the soil. The tools comprise shanks which may have integral tips, but usually include separate tip members or shovels fixed thereto. The rock shaft is adapted to be operated for permitting the tools attached thereto to be raised for transporting the plow or lowered for plowing. When, in the course of plowing, the shank or shovel encounters a relatively immovable object, such as a large rock, the rigid construction of the typical chisel plow will cause the shank or shovel to be either broken or sprung out of shape. This will obviously result in considerable expense and loss of time in replacing damaged parts. One solution which has been advanced for this problem, comprises a hinge and shear pin arrangement for attaching the shank to the plow frame. With this arrangement, when the shovel or shank strikes a rock, the force on the shank will cause the shear pin to break, allowing the shank to rotate on the hinge arrangement so as to be removed from the plowing position without damage. The operator must then stop the plowing operation, raise the entire plow out of the work position, and go bbck to the affected shank to remove the sheared pin, put the shank back into the plowing position, and replace the broken shear pin with a new shear pin. Considerable time is consumed by this operation, not to mention the expense of replacement shear pins, especially in the case where the ground being plowed contains many large rocks, necessitating many delays and repairs during the plowing operation.

OBJECTS AND SUMMARY OF THE INVENTION

It is an object of the present invention therefore, to provide an apparatus for use with a chisel plow to bring the shank back from its rigid position without breaking it or springing it out of shape when the shovel or shank encounters a relatively immovable object.

It is a further object of the present invention to provide an apparatus for use with a chisel plow for releasing a plow shank or tool upon striking an obstruction to bring the tool back from a relatively rigid operative position and then for resetting the shank automatically when the plow is raised from its work position.

Still a further object of the present invention is to provide an apparatus which includes means for setting a predetermined force at which the apparatus will release the shank from its rigid operative position.

Briefly, the present invention includes means to release the tool from its relatively rigid operative position so that the tool will be removed from the ground whenever the tool encounters any obstruction or source of reactive force greater than a predetermined force. Also included is means for returning the tool to the operative position when the obstruction or source of force has been by-passed. Further included is means for setting a predetermined force at which the apparatus will release the tool from the operative position.

The aforementioned as well as other objects and advantages of the present invention will become apparent from the following description of the accompanying drawings wherein:

FIG. 1 is a side elevational view of a chisen plow being used in conjunction with the apparatus according to the present invention.

FIG. 2 is a side elevational view, in greater detail, of the apparatus according to the present invention, in its relatively rigid operative position.

FIG. 3 is a side elevational view of a shank and shovel in conjunction with the apparatus according to the present invention, fully released from its operative position allowing the shank and shovel to be removed from the ground.

DETAILED DESCRIPTION OF THE ILLUSTRATED EMBODIMENT

Referring now more specifically to the drawings wherein like parts are designated by the same numerals throughout the various figures, a fast clamp chisel trip apparatus 12 according to the present invention shown in FIG. 2 is adapted to be installed in association with a chisel plow 10 as shown in FIG. 1. Turning specifically to FIG. 1, the chisel plow 10 may be of various known constructions and need not be described in detail. It suffices to say that the chisel plow 10 includes tools 13 mounted on a frame 16. In the particular embodiment shown for the purpose of illustrating one form of this invention, a single fast clamp chisel trip apparatus is shown in association with a single tool 13. It is understood, however, that according to the present invention, a plurality of tools may be used, each being associated with a fast clamp chisel trip apparatus of the type according to the present invention. It is also understood that each tool 13 includes a shank 14 which may have an integral trip, but preferably has a separate tip member or shovel 22 attached thereto.

The chisel plow also includes wheels 18 so that it may be pulled along the ground by a suitable vehicle in the direction indicated by arrow 25, and means 20 for rotating the frame 16 to lift the shank 14 and shovel 22 out of the work position for transporting the plow, and setting the shank 14 and shovel 22 back into the work position for the plowing operation. Rigid mounting means or bracket 24 is fixed to the frame 16 both for mounting the shank 14 upon the frame 16, and for mounting the apparatus 12 according to the present invention to cooperate with the frame 16 and the shank 14.

Referring now to FIG. 2, the apparatus 12 according to the present invention is shown in greater detail in conjunction with the rigid mounting means or bracket 24 which is welded or otherwise fixed to the frame 16. Shank 14 is rigidly connected to a shank plate 40 by means of a stabilizer bracket 70 and bolt 38. The shank plate 40 is, in turn, pivotally connected to the bracket 24 by volt 42 or other suitable means for movement between a forward or work position shown in FIGS. 1 and 2 and a retracted or release position shown in FIG. 3. A generally vertical breakover arm member or link 44 is fixed to a free end of the plate 40 by a bolt 46 or other suitable means for movement in unison therewith. An upper end of the member 44 is pivotally connected by a bolt or pin 48 with one end of a horizontal breakover link or member 50 which has an opposite end connected by a pivot bolt or pin 52 with the fixed support bracket 24. A pivot member or ear 54 is secured to the member 50 at the pivot bolt 48 in a manner so that it is held in fixed relationship to and moves in unison with the member 50. Pivot member or ear 54 has its outer end connected to one end of a spring or tension member 58. The opposite end of the spring 58 is secured by an adjustable bolt and nut fastener 60 to an outer end of an arm or weldment 68 which has its inner end connected by a bolt 52 to the fixed bracket 24. The weldment includes a strut element 67 welded or otherwise fixed to the bracket 24 at 66.

The spring 58 urges the above-described linkage mechanism in a counterclockwise direction as viewed in FIG. 1 until an adjustable screw or stop element 64 carried by the member 44 engages an abutment or stop surface 65 on the bracket 24. It will be noted that in this forward or work position, the axes of the bolts or pivot pins 46, 48 and 52 are disposed generally along a common imaginary line which substantially coincides with the longitudinal axis of the link 50. Furthermore, this line is generally tangent to an arc of movement of the pin 46 about the axis of the pin 42. Thus, any reactive force tending to rotate or retract the tool in a clockwise direction is applied through the member 40, the pin 46, and the member 44 to the pin 48 substantially along the aforesaid common center or tangent line. If the longitudinal axis of the member 50 is in an exact alignment with said imaginary common line, the linkage is effectively locked against movement. However, as indicated, the position of the member 50 may be adjusted slightly out of exact alignment by the screw 64 so that there is a small effective lateral lever arm for enabling the aforementioned reactive force to urge the member 50 in a clockwise direction away from the common alignment or substantially self-locking position for releasing the tool. Such reactive forces are normally resisted by the yieldable pull of the spring 58 acting through the relatively long generally vertical lever arm provided by the linkage.

In operation, the plow is pulled toward the right as viewed in FIG. 1 with the tool penetrating the ground. The force applied to the shank 14 in normal plowing is insufficient to overcome the above-described force holding the tool in the work position. In the event a large obstacle such as a rock 26 is encountered, a relatively higher reactive force than in normal plowing is applied to the tool shank 14. This reactive force is transmitted through the plate member 40, the pin 46, and member 44 and applied to the pin 48 to provide a horizontal component sufficient to overcome the spring force and cause member 50 to rotate from the vertical or generally dead center alignment position so that the shank plate 40 rotates from the forward or work position shown in FIG. 1 about the pivot bolt 42. As the member 50 leaves the vertical position, the vertical effective moment arm provided by the linkage system decreases rapidly, and even though the spring is increasingly stretched, the effective force holding the plow tool decreases rapidly and the tool pivots relatively easily to the retracted position thereby minimizing any danger of breakage or injury.

The amount of reactive force from the ground or an obstacle that the apparatus 12 can withstand before going into the above-described breakover mode is determined by the alignment of the bolts or pivots 46, 52 and 48 and by the tension of the spring 58. As indicated, the alignments of the pivots can be adjusted by means of the screw 64. The initial tension in the spring 58 may be adjusted by means of the fastener 60.

Referring now to FIG. 3, the apparatus 12 is shown in its fully retracted position as a result of the interaction of the elements as described above. The tension member 58 is shown under full tension. The maximum retracted position of the linkage mechanism or apparatus 12 is determined by engagement of an abutment surface on the bolt 38 or bracket 70 with a complementary abutment or stop surface 71 on the strut element 67. It is to be noted that, in this position, the effective spring force through the linkage mechanism is sufficient to return the tool to the work position when the reactive force supplied by the obstacle and the ground is relieved. Thus, to return the tool to the work position, it is simply necessary to actuate the plow about the rock shaft 20 toward its normal transport position, thereby lifting the tools 13 up substantially out of the ground. When the reactive force of the ground against the tool is sufficiently relieved, the tension on spring 58 causes the linkage mechanism to go back into the work position shown in FIGS. 1 and 2 thereby causing the tool to return to its plowing position. The plow is then actuated in the usual manner to lower the tool into engagement with the ground. It will be appreciated that with the foregoing structure, an operator may automatically reset the tool to the working position from the cab of the tractor and without replacing any parts such as shear pins which have heretofore been relied upon to prevent damage to the plow.

While a preferred embodiment of the present invention has been shown and described herein, it is obvious that many details may be changed without departing from the spirit and scope of the appended claims.

The invention claimed is as follows:

1. A fast clamp chisel trip apparatus for use with a chisel plow having a frame, a plowing tool including a shank, and means pivotally connecting said shank to said frame, said apparatus comprising rigid mounting means fixed to said frame, a shank plate having first and second ends, means rigidly connecting said first end of said shank plate to said shank, first pin means pivotally connecting said first end of said shank plate to said mounting means for movement of said shank between a work position and a retracted position, linkage means connected to said second end of said shank plate and said frame for releasably holding said shank in said work position and for permitting movement of said shank to said retracted position whenever said tool encounters a resisting force greater than a predetermined force, said linkage means including a generally vertical member and a breakover member, said vertical member having first and second ends, second pin means connecting said first end of said vertical member to said second end of said shank plate for movement in unison therewith, said breakover member having first and second ends, third pin means pivotally connecting said first end of said breakover member to said second end of said vertical member, fourth pin means pivotally connecting said second end of said breakover member to said mounting means for locating axes of said second, third and fourth pin means substantially adjacent to an imaginary line when said shank is in said work position, said line being substantially tangent to an arc of movement of said second pin about the axis of said first pin during movement of said shank from said work position toward said retracted position to align said linkage means for transmitting said resisting force through said shank plate, said second pin and said vertical member to said third pin substantially along said line whereby said breakover member substantially locks said shank in the work position until said predetermined resisting force is exceeded, and a tension member connected between said linkage means and said frame for yieldably biasing said linkage means and said shank from the retracted position to the work position.

2. The apparatus of claim 1 further including a pivot member having first and second ends, said first end of said pivot member connected to said breakover member in a fixed relationship thereto to move in unison therewith, said tension member having first and second ends, said first end connected to said second end of said pivot member, a weldment member including an inner end connected to said mounting means, a strut connected to said shank plate and an outer end connected to said second end of said unison means, for preventing said movement of said breakover member away from said line until predetermined resisting force is exceeded.

3. The apparatus of claim 1 further including return means for returning said shank to said work position when said resisting force has been relieved comprising rockshaft means transversely journalled upon said rigid frame for rotating the plow about said rockshaft to a transport position, thereby lifting said tool up substantially out of the ground, for said tension member to cause said breakover member to return to said common line with said second, third and fourth pins, thereby bringing said linkage back into the work position.

4. The apparatus of claim 1 further including an adjustable stop element disposed between said linkage means and said mounting means for adjusting said third pin means away from said line, to create a small effective lateral lever arm for enabling said resisting force to urge said breakover member in a direction away from said line to enable said linkage to move said shank from said work position to said retracted position.

5. The apparatus of claim 4, wherein said adjustable stop element comprises a screw for adjusting said effective lateral lever arm so as to selectively vary said predetermined force.

* * * * *

UNITED STATES PATENT AND TRADEMARK OFFICE
CERTIFICATE OF CORRECTION

PATENT NO. : 4,116,281
DATED : September 26, 1978
INVENTOR(S) : Lawrence L. Lant It is certified that error appears in the above-identified patent and that said Letters Patent are hereby corrected as shown below:

Col. 1, line 37, "bbck" should be --back--;

Col. 2, line 9, "chisen" should be --chisel--;

Col. 2, line 41, "trip" should be --tip--;

Col. 2, line 61, "volt" should be --bolt--;

Col. 4, line 19, "tools" should be --tool--;

Col. 5, line 21, "unison" should be --tension--.

Signed and Sealed this

Thirtieth Day of January 1979

[SEAL]

Attest:

RUTH C. MASON
Attesting Officer

DONALD W. BANNER
Commissioner of Patents and Trademarks